United States Patent [19]

Podola et al.

[11] Patent Number: 5,525,654

[45] Date of Patent: Jun. 11, 1996

[54] POLYURETHANE-BASED SEALING AND ADHESIVE COMPOSITIONS CONTAINING SPECIAL DIURETHANE PLASTICIZERS

[75] Inventors: Tore Podola, Monheim; Martin Majolo, Erkelenz; Winfried Emmerling, Neuss; Lothar Unger, Erkrath, all of Germany

[73] Assignee: Henkel Kommanditgesellschaft auf Aktien, Duesseldorf, Germany

[21] Appl. No.: 307,549

[22] Filed: Sep. 16, 1994

Related U.S. Application Data

[63] Continuation of Ser. No. 30,297, Mar. 18, 1993, abandoned.

[30] Foreign Application Priority Data

Sep. 18, 1990 [DE] Germany .................. 40 29 504.4

[51] Int. Cl.$^6$ .................. C09J 175/04; C09K 3/10
[52] U.S. Cl. .................. 524/199; 524/567; 524/568; 524/569; 524/912; 525/129; 528/28; 528/29; 528/30; 528/38
[58] Field of Search .................. 524/199, 567, 524/568, 569, 912; 525/129; 528/28, 29, 30, 38

[56] References Cited

U.S. PATENT DOCUMENTS

| | | | |
|---|---|---|---|
| 3,627,722 | 12/1971 | Seiter | 260/37 |
| 4,555,561 | 11/1985 | Sugimori et al. | 528/26 |
| 4,798,878 | 1/1989 | Brinkmann et al. | 528/28 |
| 4,824,888 | 4/1989 | Emmerling et al. | 524/199 |

FOREIGN PATENT DOCUMENTS

| | | |
|---|---|---|
| 0170865 | 2/1986 | European Pat. Off. . |
| 0261409 | 3/1988 | European Pat. Off. . |
| 1140301 | 6/1957 | France . |
| 1189988 | 10/1959 | France . |
| 1217009 | 4/1960 | France . |
| 1254063 | 1/1961 | France . |
| 3714768 | 5/1987 | Germany . |

OTHER PUBLICATIONS

*Principles of Polymer Chemistry*, p. 36.
Arbeitsgemeinschaft der Fachgemeinschaft Dichstoffmassenhersteller des Maler– und Lackierhandwerks und der Lackindustrie, "Des Maler– und Lackierhandwerk", No. 7, 1983 Reprint, pp. 6–8.
Plueddemann, "Silane Coupling Agents", Plenum Press, New York (1982), pp. 29–45.

*Primary Examiner*—Frederick Krass
*Attorney, Agent, or Firm*—Wayne C. Jaeschke; J. Daniel Wood; Daniel S. Ortiz

[57] ABSTRACT

Described are moisture-curing sealing and/or adhesive compositions based on alkoxysilane-terminated polyurethanes and containing diurethanes as plasticizers. The diurethanes are prepared either from diol mixtures and mono-functional isocyanates, reacting with substantially all the free hydroxyl groups, or from diisocyanates and mono-functional alcohols, reacting with substantially all the free isocyanate groups. Also described is a method of preparing the moisture-curing sealing and/or adhesive compositions and their use as joint sealants.

20 Claims, No Drawings

POLYURETHANE-BASED SEALING AND ADHESIVE COMPOSITIONS CONTAINING SPECIAL DIURETHANE PLASTICIZERS

This application is a continuation of application Ser. No. 08/030,297 filed on 18 March 1993, now abandoned.

FIELD OF THE INVENTION

This invention relates to sealing and/or adhesive compositions, based on alkoxysilane-terminated polyurethanes, which contain diurethanes as a plasticizer component, to a process for their production and to the use of alkoxysilane-terminated polyurethanes in admixture with diurethanes as sealing and/or adhesive compositions.

STATEMENT OF RELATED ART

Alkoxysilane-terminated, moisture-curing one-component polyurethanes are being used to an increasing extent as coating, sealing and adhesive compositions in the building industry and in the automotive industry. In these applications, elasticity, adhesive power and cure rate have to meet stringent requirements. Plasticizers may be added to this system to improve its elasticity and also its softness, flexibility and processability. Hitherto, conventional plasticizers have always been incorporated as one of the usual additives in alkoxysilane-terminated polyurethanes. Thus, according to U.S. Pat. No. 4,555,561, for example, phthalates, benzoates, chlorinated paraffins or aromatic hydrocarbons are added as plasticizers in quantities of up to 20% by weight. Unfortunately, the disadvantage of these conventional plasticizers is their tendency to migrate, which is attributable to diffusion, vapor pressure and convection processes and which is in evidence, above all, when the alkoxysilane-terminated polyurethanes come into contact with other liquids or solids. For example, cured alkoxysilane-terminated polyurethanes coated with paints or the like undergo an unfavorable change in appearance due to the tendency of conventional plasticizers towards migration.

DE-OS 37 14 768 describes polyurethane sealing compositions, curing through NCO groups, which contain a swellable PVC powder and which contain diurethanes as an additional plasticizer (extender). The diurethanes used therein as additional plasticizers on the one hand prevent the crosslinking reaction of the isocyanate-terminated polyurethanes during storage and, on the other hand, limit the swelling behavior of the PVC. Accordingly, all that is apparent to one skilled in the art from the document in question is that NCO-terminated polyurethanes containing PVC as plasticizer become more stable in storage through additions of diurethanes and, at the same time, limit the swellability of the PVC.

DESCRIPTION OF THE INVENTION

Object of the Invention

The problem addressed by the present invention was to provide sealing and/or adhesive compositions, based on alkoxysilane-terminated polyurethanes, which would contain a plasticizer compatible with alkoxysilane-terminated polyurethanes that would avoid the disadvantages of known plasticizers.

SUMMARY OF THE INVENTION

Accordingly, the present invention relates to moisture-curing sealing and/or adhesive compositions capable of application at room temperature containing:

alkoxysilane-terminated polyurethanes prepared by substantially complete reaction of the free NCO groups of isocyanate-terminated polyurethane prepolymers with alkoxysilanes containing NCO-reactive groups and as plasticizers diurethanes produced from diol mixtures and monofunctional isocyanates with substantially complete reaction of the free OH groups or from diisocyanates and monofunctional alcohols with substantially complete reaction of the free NCO groups.

The moisture-curing sealing and/or adhesive compositions according to the invention contain alkoxysilane-terminated polyurethanes and diurethanes as plasticizers, optionally in admixture with other typical additives. Alkoxysilane-terminated polyurethanes are obtained in known manner by reaction of substantially all the free NCO groups of NCO-terminated polyurethane prepolymers with alkoxysilanes containing isocyanate-reactive groups. The NCO-terminated polyurethane prepolymers are obtained using OH-terminated polyol mixtures and diisocyanates. One or more polyols from the group consisting of polyether polyols, polyester polyols, polyalkylene diols and/or polyacetals containing two or more free OH groups may be used for the purposes of the invention.

DESCRIPTION OF PREFERRED EMBODIMENTS

The polyols mentioned and their production are known from the prior art. For example, polyester polyols may be prepared by reaction of dicarboxylic acids with triols or with an excess of diols and/or triols and by ring opening of epoxidized (fatty) esters with alcohols. Polycaprolactone diols obtainable from $\epsilon$-caprolactone and diols, are also suitable as polyester polyols. According to the invention, polyester polyols are preferably obtained by reaction of low molecular weight dicarboxylic acids, such as adipic acid, isophthalic acid, terephthalic acid and phthalic acid, with an excess of diols containing 2 to 12 carbon atoms, trimethylol propane and/or glycerol. Polycondensation products of formaldehyde and diols and/or polyols in the presence of acidic catalysts are mentioned as examples of polyacetals. Polyalkylene diols, such as polybutadiene diol for example, are commercial products obtainable in various molecular weights. Polyether polyols may be obtained, for example, by copolymerization or block polymerization of alkylene oxides, such as ethylene oxide, propylene oxide and butylene oxide, or by reaction of polyalkylene glycols with difunctional or trifunctional alcohols. However, the polymerized ring opening products of tetrahydrofuran with alcohols are also suitable as polyether polyols. One preferred embodiment of the invention is characterized by the use of alkoxylation products, more particularly ethoxylation and/or propoxylation products, of difunctional or trifunctional alcohols selected from the group consisting of ethylene glycol, diethylene glycol, triethylene glycol, propane-1,2-diol, dipropylene glycol, the butane diols, hexane diols, octane diols, technical mixtures of hydroxy fatty alcohols containing 14 to 22 carbon atoms, more particularly hydroxystearyl alcohol, trimethylol propane and glycerol. Polyols having an average molecular weight (i.e., more fully, number average molecular weight) in the range from 300 to 6000 and, more particularly, in the range from 500 to 4000 are preferred for the purposes of the invention. Mixtures of OH-terminated linear polyols and, in particular, polyol mixtures at least partly containing polypropylene glycol having a molecular weight of 1000 to 6000 are most particularly preferred. The mixtures of the OH-terminated polyols preferably contain polypropylene glycol having an average molecular weight of 1000 to 6000 in quantities of more than 50% by weight and preferably in quantities of more than 70% by weight to 100% by weight, based on polyol mixture. Mixtures of polypropylene glycols differing in their molecular weights may of course also be used. To obtain sufficiently high strength values for practical purposes after curing of the alkoxysilane-terminated polyurethanes, the percentage content of high molecular weight polypropylene glycol should be limited. The mixtures of polypropylene glycols differing in molecular weight preferably contain polypropylene glycol having molecular weights above 4000 in quantities of less than 75% by weight, based on the polyol mixture.

In one embodiment of the invention, the OH-terminated polyols are reacted with diisocyanates to form NCO-terminated polyurethane prepolymers having an average NCO functionality of at least 2. Suitable diisocyanates include aromatic diisocyanates, such as 2,4- and 2,6-tolylene diisocyanate, 1,5-naphthalene diisocyanate, 4,4-diphenylmethane diisocyanate, 3,3-dimethoxy-4,4-diphenyl isocyanate and/or xylylene diisocyanates. Suitable aliphatic diisocyanates are, in particular, 1,4-tetramethylene diisocyanate, 1,6-hexamethylene diisocyanate, decane-1,10-diisocyanate, 2,2,4-trimethyl hexamethylene diisocyanate, dicyclohexyl methane diisocyanate, tetramethylene xylylene diisocyanates, isophorone diisocyanate and/or the technical isocyanates obtainable by phosgenation from the amines formed in the hydrogenation of dimer fatty acid nitriles. Aliphatic diisocyanates, more particularly trimethyl hexamethylene diisocyanate, are recommended for applications in which the alkoxysilane-terminated polyurethanes are intended to replace silicones.

In a second embodiment of the present invention, NCO-terminated polyurethane prepolymers having an average NCO functionality of at least 1 and less than 2 are reacted with alkoxysilanes. The corresponding NCO-terminated polyurethanes having an average NCO functionality of at least 1 and less than 2 can be obtained by two different methods:
a) polyurethane prepolymers having an average NCO functionality of at least 2 are subsequently reacted with linear or branched aliphatic monofunctional alcohols containing 1 to 18 carbon atoms and/or monoalkyl polyether alcohols to form a polyurethane prepolymer having an average NCO functionality of at least 1 and less than 2 or
a') OH-terminated polyols are reacted with a mixture of mono- and diisocyanates to form NCO-terminated polyurethane prepolymers having an average NCO functionality of at least 1 and less than 2.

The linear or branched aliphatic monofunctional alcohols used in variant a) are, in particular, methanol, ethanol, isomers of propanol, butanol and/or hexanol and also $C_{8-18}$ fatty alcohols, such as octanol, decanol, dodecanol, tetradecanol, hexadecanol and/or octadecanol. The fatty alcohols may be obtained, for example, by reduction of natural fatty acids and may be used both in pure form and in the form of technical mixtures. Linear monoalcohols, particularly $C_{4-18}$ linear monoalcohols, are preferred because the lower alcohols are difficult to produce in anhydrous form. Monoalkyl polyether alcohols differing in their molecular weight, preferably over the range from 1000 to 2000, may be used instead of or in admixture with the linear or branched aliphatic alcohols. Monobutyl propylene glycol is preferred, being used either on its own or in admixture with aliphatic linear alcohols containing 4 to 18 carbon atoms.

The monoisocyanates used in admixture with the diisocyanates described above in variant a') are preferably aromatic monoisocyanates, such as phenyl isocyanate, tolylene isocyanate and/or naphthylene isocyanate.

After their reaction with alkoxysilanes, the polyurethane prepolymers having an NCO functionality of at least 2 obtained in accordance with the first embodiment give relatively hard sealing and adhesive compositions. These polyurethane prepolymers preferably have an average NCO functionality of 2 to 2.5. Higher NCO functionalities of the polyurethane prepolymers result in highly crosslinked and hence highly viscous products which are almost impossible to handle in practice.

The polyurethane prepolymers having an average NCO functionality of at least 1 and less than 2 obtained in accordance with the second embodiment give soft and elastic sealing and/or adhesive compositions. The lower the NCO functionality of the NCO-terminated polyurethane prepolymers, the softer the cured silanized end products will be. Accordingly, the number average NCO functionality of the NCO-terminated polyurethane prepolymers is best between 1.2 and 1.8.

The NCO-terminated polyurethane prepolymers obtained in accordance both embodiments and both variants are reacted with alkoxysilanes containing isocyanate-reactive groups, substantially all the free NCO groups of the polyurethane prepolymers reacting off. In principle, suitable alkoxysilanes are those which contain a reactive hydrogen atom or an epoxy group in the reactive group. Alkoxysilanes corresponding to the following general formula:

$$X-(CH_2)_n-\underset{\underset{R}{|}}{Si}-(OR^1)_2$$

in which p1 X=SH, NHR$^2$,

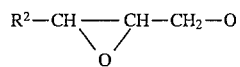

and/or, $(NH-CH_2-CH_2)_m-NHR^2$;

R=—CH$_3$, —CH$_2$H$_5$ and/or OR$^1$;

R$^1$=an optionally substituted aliphatic, cycloaliphatic and/or aromatic hydrocarbon radical containing 1 to 10 carbon atoms;

R$^2$=H and/or an optionally substituted aliphatic, cycloaliphatic and/or aromatic hydrocarbon radical containing 1 to 10 carbon atoms;

n=2 to 6;

m=1 or 2; are preferably used.

The alkoxysilanes corresponding to the above formula are products known per se. The production of the aminoalkyl alkoxysilanes and the N-(aminoalkyl)-aminoalkyl alkoxysilanes is described in French patents 11 40 301, 11 89 988, 12 17 009 and 12 54 063 and in the book by Plueddemann entitled *Silane Coupling Agents* (Plenum Press, New York, 1982), pages 29 to 45. In general, amino-organofunctional alkoxysilanes are obtained by reaction of haloalkyl alkoxysilanes with ammonia or amines or by hydrogenation of cyanoalkyl alkoxysilanes. Mercaptoalkyl alkoxysilanes are obtained, for example, by reaction of chloroalkyl alkoxysilanes and ammonium salts of hydrogen sulfide. Epoxyalkyl alkoxysilanes are also described in Plueddmann's book and may be obtained, for example, by addition of alkoxysilanes onto unsaturated epoxides or by epoxidation of alkylene alkoxysilanes.

According to the invention, the same or different aminoalkyl alkoxysilanes corresponding to the above formula may be used. Mercaptoalkyl alkoxysilanes and/or aminoalkyl alkoxysilanes are preferably used by virtue of their ready accessibility. Of the aminoalkyl alkoxysilanes, (β-aminoethyl)-trimethoxysilane, (γ-aminopropyl)-trimethoxysilane, (β-aminoethyl)-methyl dimethoxysilane, (γ-aminopropyl)methyl dimethoxysilane, (β-aminomethyl)-trimethoxysilane, (γ-aminopropyl)-triethoxysilane, (β-aminoethyl)-methyl diethoxysilane and/or (γ-aminopropyl)-methyl diethoxysilane are particularly suitable. Of the mercaptoalkyl alkoxysilanes, mercaptoethyl trimethoxysilane, mercaptopropyl trimethoxysilane, mercaptoethyl methyl dimethoxysilane, mercaptopropyl triethoxysilane, mercaptoethyl methyl diethoxysilane and/or mercaptopropyl methyl diethoxysilane are preferred.

The reactivities of the alkoxysilane-terminated polyurethanes can be controlled through the nature of the substituents R and $R^1$. Particularly good reactivities are obtained when R has the meaning $OR^1$, i.e. in the case of aminofunctional trialkoxysilanes containing a group reactive to the isocyanate groups. In addition, the reactivity can be further controlled through the alkoxy group $OR^1$. Thus, the preferred amino- and/or mercaptoalkyl alkoxysilanes can be cured much more quickly when the substituent $R^1$ is an aliphatic short-chain hydrocarbon radical. Accordingly, mercaptoethyl trimethoxysilane, mercaptopropyl trimethoxysilane, (β-aminoethyl)-trimethoxysilane and/or (γ-aminopropyl)-trimethoxysilane are most particularly preferred.

In a less preferred embodiment of the present invention, other alkoxysilanes containing isocyanate-reactive groups may be reacted with the polyurethane prepolymers in admixture with the alkoxysilanes corresponding to the general formula. Thus, the aminophenyl alkoxysilanes, carboxy- and/or hydroxy-modified alkoxysilanes mentioned in Plueddmann's book may be used in small quantities, preferably less than 20% by weight, based on alkoxysilanes.

The reaction of the NCO-terminated polyurethane prepolymers with the alkoxysilanes is preferably carried out in the presence of catalysts, for example the catalysts known from U.S. Pat. No. 3,627,722. Tin and/or titanium compounds, particularly dibutyl tin dilaurate, are preferably used as catalysts.

According to the invention, the moisture-curing sealing compositions and/or adhesives contain diurethanes as plasticizers in addition to alkoxysilane-terminated polyurethanes. Diurethanes are compounds known per se which may be obtained either by reaction of OH-terminated diols and monofunctional isocyanates with substantially all the free hydroxyl groups reacting off or by reaction of diisocyanates and monofunctional alcohols with substantially all the free NCO groups reacting off. Diols containing 2 to 22 carbon atoms such as, for example, ethylene glycol, propylene glycol, propane-1,2-diol, dibutane diol, hexane diol, octane diol, technical mixtures of hydroxy fatty alcohols containing 14 carbon atoms, more particularly hydroxystearyl alcohol, may be used for the production of the diurethanes based on diols. Linear diol mixtures are preferred, those containing polypropylene glycol with an average molecular weight of 1000 to 6000 in quantities of more than 50% by weight and preferably more than 70% by weight being particularly preferred. Diurethanes based solely on polypropylene glycol with the same or different average molecular weights of 1000 to 4000 are most particularly preferred. The free hydroxyl groups of the diol mixtures are reacted off substantially completely with aromatic and/or aliphatic monoisocyanates. Aromatic monoisocyanates, such as phenyl isocyanate and/or tolylene isocyanate, are preferred.

Aromatic and/or aliphatic diisocyanates are used for the production of the diurethanes based on diisocyanates. Suitable aromatic and/or aliphatic diisocyanates are, for example, those which have already been described in reference to the production of the polyurethane prepolymers, preferably tolyl diisocyanate. The free NCO groups of the diisocyanates are reacted off substantially completely with monofunctional alcohols, preferably linear monofunctional alcohol mixtures. Linear monofunctional alcohol mixtures are particularly suitable. Suitable monoalcohols are, for example, those containing 1 to 24 carbon atoms, such as propanol, butanol, hexanol, octanol, decanol, dodecanol. In addition, technical mixtures of alcohols and also polyalkylene glycol monoalkyl ethers are also suitable. Alcohol mixtures containing polypropylene glycol monoalkyl ethers with an average molecular weight of 500 to 2000 in quantities of more than 50% by weight and preferably more than 70% by weight, based on the alcohol mixture, are particularly suitable. Diurethanes based on diisocyanates, of which the free NCO groups have been completely reacted with polypropylene glycol monoalkyl ether having an average molecular weight of 500 to 2000, are particularly preferred.

The sealing and adhesive compositions according to the invention contain:

alkoxysilane-terminated polyurethanes in quantities of 20 to 50% by weight and preferably in quantities of 25 to 45% by weight, diurethanes in quantities of 5 to 50% by weight and preferably 10 to 40% by weight typical additives in quantities of 0 to 75% by weight and preferably 10 to 80% by weight, based in each case on the particular composition.

The quantities in which the typical additives are incorporated and also their composition differ according to the particular application. Pigments, fillers, curing catalysts, dyes, thickeners, coupling agents, extenders and UV stabilizers are generally incorporated as typical additives. In addition to the described diurethanes, commercially available plasticizers, such as phthalates, may of course also be incorporated as additives, although in that case the improvement in compatibility with paints diminishes according to the quantity of commercial plasticizers added. Accordingly, it is preferred not to add commercial plasticizers. Suitable fillers are isocyanate-inert inorganic compounds such as, for example, chalk, lime flour, precipitated and/or pyrogenic silica, aluminum silicates, ground minerals and other inorganic fillers familiar to the expert. In addition, organic fillers, particularly short-staple fibers and the like, may also be used. Fillers which provide the preparations with thixotropic properties for example swellable polymers, are preferred for certain applications. The typical additives mentioned may be used in the quantities familiar to one skilled in the art.

Curing may be accelerated by the addition of organic or inorganic compounds, such as for example dibutyl tin diacetate, dibutyl tin dilaurate and/or tetrabutyl dioleatodistannoxane, in small quantities as catalysts. In addition to the curing catalysts, small quantities of amines, such as (β-aminoethylaminopropyl)-trimethoxysilane and/or lauryl amine, may also be added to accelerate curing. The cure rate may be varied within wide limits according to the particular application through the quantity of curing catalysts and, optionally, amines added.

The present invention also relates to a process for the production of moisture-curing sealing and/or adhesive compositions containing alkoxysilane-terminated polyurethanes and plasticizers. According to the invention, alkoxysilane-terminated polyurethanes which have been prepared by reaction of substantially all the free NCO groups of NCO-terminated polyurethane prepolymers and alkoxysilanes are added with stirring, preferably at temperatures of 15° to 80° C., to the diurethanes which have been prepared from diol mixtures and monofunctional isocyanates with substantially all the free OH groups reacting off or from diisocyanates and monofunctional alcohols with substantially all the free NCO groups reacting off.

The typical additives may then optionally be added.

The present invention also relates to the use of mixtures containing alkoxysilane-terminated polyurethanes and diurethanes as moisture-curing sealing compositions and/or adhesives, optionally using typical additives. The mixtures containing alkoxysilane-terminated polyurethanes and diurethanes are preferably used as joint sealing compositions. The soft and elastic joint sealing compositions, of which the alkoxysilane-terminated polyurethanes have been synthesized from NCO-terminated polyurethane prepolymers having an average NCO functionality of at least 1 and less than 2, are preferably used for connecting joints in the building industry. The hard joint sealing compositions, of which the alkoxysilane-terminated polyurethanes have been synthesized from NCO-terminated polyurethane prepolymers having an average NCO functional of at least 2, are preferably used in assembly bonding and in the bonding of mirrors.

EXAMPLES

A) Preparation of the alkoxysilane-terminated polyurethanes

Example 1

1000 Parts (=1 equivalent) of polypropylene glycol having an average molecular weight of 2000 and 113.1 parts (=1.3 equivalents) of tolylene diisocyanate (TDI) were reacted while stirring with 0.6 part of dibutyl tin dilaurate at 90° C. to form an NCO-terminated prepolymer. The theoretical NCO content of 1.13% was reached after 2 hours. The mixture was cooled to 60° C. and 53.7 parts (=0.3 equivalent) of aminopropyl trimethoxysilane was added slowly enough that the temperature did not exceed 80° C., followed by stirring for another 30 minutes. The NCO content of the alkoxysilane-terminated polyurethane was below 0.03%. The product had a Brookfield viscosity of 210,000 mPas at 25° C.

Example 2

As in Example 1, 500 parts (=0.5 equivalent) of polypropylene glycol having an average molecular weight of 2000, 1000 parts (=0.5 equivalent) of polypropylene glycol having an average molecular weight of 4000 and 136.5 parts (=1.3 equivalents) of trimethyl hexamethylene diisocyanate (TMDI) were reacted while stirring with 0.83 part of dibutyl dilaurate at 100° C. After 5 hours, the mixture was cooled to 60° C. and 53.7 parts (=0.3 equivalent) of aminopropyl trimethoxysilane were added slowly enough that the temperature did not exceed 80° C. The mixture was then stirred for about another 30 minutes. The NCO content of the alkoxysilane-terminated polyurethane measured thereafter was below 0.03%. The product had a Brookfield viscosity of 80,000 mPas at 25° C.

Example 3

As in Example 1, 1000 g (=1 equivalent) of polypropylene glycol having an average molecular weight of 2000 and 136.5 parts (=1.3 equivalents) of trimethyl hexamethylene diisocyanate were reacted while stirring with 0.5 part of dibutyl tin dilaurate at 90° C. The theoretical NCO content of 1.11% was reached after 4 hours. The mixture was then cooled to 65° C. and 53.7 parts of aminopropyl trimethoxysilane (=0.3 equivalent) were added slowly enough that the temperature did not exceed 80° C. The reaction mixture was then stirred for another 30 minutes. The NCO content of the alkoxysilane-terminated polyurethane was below 0.03%. The product had a Brookfield viscosity of 115,000 mPas at 25° C.

B) Preparation of the diurethanes

Example 4

In a heatable stirred reactor, 450 parts by weight of polypropylene glycol having an average molecular weight of 2000, 53.6 parts of phenyl isocyanate and 0.05 part by weight of dibutyl tin dilaurate were stirred in a nitrogen atmosphere at a temperature of 100° C. The reaction was followed by determination of the NCO content. When no more free NCO could be detected (about 6 hours), the reaction was terminated. The diurethanes had a Brookfield viscosity of 3000 mPaos at 25° C.

Example 5

552 Parts by weight of polypropylene glycol monobutyl ether, average molecular weight 1000, 62.5 parts by weight of 4,4'-diphenyl methane diisocyanate and 0.06 part by weight of butyl tin dilaurate were reacted as in Example 4. The diurethane had a Brookfield viscosity of 4000 mPa.s at 25° C.

C) Formulation of the sealing compositions

The parts mentioned in the following are parts by weight.

Example 6

29 Parts of the alkoxysilane-terminated polyurethane of Example 1 were stirred with 16 parts of the diurethane of Example 5, 3 parts of vinyl trimethoxysilane and 2.1 parts of xylene at room temperature in a vacuum planetary dissolver. 42 parts of chalk, 6 parts of titanium dioxide, 0.3 part of benztriazole (UVabsorber) and 0.3 part of Tinuvin-765 (sterically hindered amine as antioxidant) were added to the mixture which was then stirred in vacuo (25 mbar) at 2000 to 3000 r.p.m. until a smooth homogeneous paste was formed. The paste was then stirred in vacuo with 0.2 part of 1-dodecyl amine, 1 part of aminotrimethoxysilane (=drying agent) and 0.1 part of dibutyl tin dilaurate and packed in a cartridge. The properties of the sealing composition are set out in Table 1.

Example 7

As in Example 6, 35 parts of the alkoxysilane-terminated polyurethane of Example 2 were stirred with 10 parts of the diurethane of Example 4, 3.7 parts of vinyl trimethoxy

TABLE 1

|  | Example 6 | Example 7 | Example 8 |
|---|---|---|---|
| Skin formation (mins.) | 20 | 50 | 30 |
| E-50 modulus (N/mm$^2$) | 1.8 | 0.4 | 1.5 |
| Elongation at break (%) | 60 | 60 | 60 |
| Stability in storage (months) | 6 | 9 | 6 | silane and 3.4 parts of xylene. 39 parts of chalk, 2.8 parts of titanium dioxide, 0.3 part of benztriazole, 0.3 part of Tinuvin-765, 0.05 part of carbon black and 1.15 parts of iron oxide were added to the mixture which was then stirred in vacuo (25 mbar). The paste obtained was then stirred in vacuo with 0.2 part of 1-dodecyl amine, 1 part of aminotrimethoxysilane and 0.1 part of dibutyl tin dilaurate and packed in a cartridge. The properties of the composition are shown in Table 1.

Example 8

As in Example 6, 28 parts of the alkoxysilane-terminated polyurethane of Example 3 were stirred with 16 parts of the diurethane of Example 4, 3.7 parts of vinyl trimethoxysilane and 1.31 parts of xylene at room temperature in a vacuum planetary dissolver. The mixture was then stirred in vacuo (25 mbar) with 43 parts of chalk, 6 parts of titanium dioxide, 0.3 part of benztriazole and 0.3 part of Tinuvin-765. 0.2 part of 1-dodecyl amine, 1 part of aminotrimethoxysilane and 0.1 part of dibutyl tin dilaurate were then added and, after stirring in vacuo, the composition was packed in a cartridge. The properties of the composition are shown in Table 1.

The test methods are taken from DIN 18 540. The E modulus was determined in accordance with DIN 52 455. The skin formation time was determined by sensitive testing, for which purpose the composition was sprayed on in the form of a strand (diameter 1 cm, length 15 cm) and was cured in a conditioned room atmosphere (23°, 50% air humidity).

Comparison Example 1 Effect of the diurethanes on compatibility with paints

A joint sealing composition based on alkoxysilane-terminated polyurethanes according to Example 1 was produced as described in Example 6. In contrast to Example 6, 16 parts of a standard plasticizer, i.e. phthalic acid octyl benzyl ester (Santicizer-261®, a product of Monsanto), was incorporated in the composition instead of the diurethane. The difference in compatibility with paints can be seen from Table 2.

TABLE 2

| Joint Sealing Composition | Bondex-BBZ® acrylic paint white | Adler, water-diluted acrylic paint red | Gori Fenster-lasur® teak | Büchner Flüss-kunststoff® concrete grey |
| --- | --- | --- | --- | --- |
| Example 6 | 1 | 2 | 1-2 | 3 |
| Comparison Example 1 | 4-5 | 4-5 | 4 | 5-6 |
| Comparison Example 2 | 3 | 5 | 3 | 5-6 |

Comparison Example 2

Synergistic effect of alkoxysilane-terminated polyurethanes and diurethanes

The diurethane of Example 5 was prepared with an NCO-terminated polyurethane containing swellable PVC in accordance with DE 37 14 678 (Example 2) rather than with an alkoxysilane-terminated polyurethane. The difference in compatibility with paints can again be seen from Table 2. Determination by the Arge method Compatibility with paint was tested by the method recommended by the Arbeitsgemeinschaft der Fachgemeinschaft Dichtstoffmassenhersteller des Maler- und Lackierhandwerks und der Lackindustrie (see Das Maler- und Lackierhandwerk, No. 7, 1983 Reprint, pages 6-8). Flow defects, surface tack, adhesion of the cured film to the substrate, wrinkling of the cured film and discoloration were awarded marks. The averages of the individual marks are shown in Table 2. The compositions with a mark of 1 are suitable whereas the compositions with a mark of 5 to 6 are unsuitable.

The invention claimed is:

1. Moisture-curing sealing and adhesive compositions, capable of application at room temperature, said compositions comprising:

alkoxysilane-terminated polyurethanes prepared by substantially complete reaction of the free NCO groups of isocyanate-terminated polyurethane prepolymers with alkoxysilanes containing NCO-reactive groups and as plasticizers diurethanes produced by reacting
   a) diol mixtures and monofunctional isocyanates with substantially complete reaction of the free OH groups, or by reacting
   b) diisocyanates and monofunctional alcohols with substantially complete reaction of the free NCO groups.

2. Sealing and adhesive compositions as claimed in claim 1, comprising alkoxysilane-terminated polyurethanes in quantities of 20 to 50%, by weight, diurethanes in quantities of 5 to 50% by weight, and, optionally, other additives in quantities of 0 to 75% by weight, based on the particular composition.

3. Sealing and adhesive compositions as claimed in claim 2, comprising as plasticizers diurethanes which have been produced by reacting
   a) linear diol mixtures containing polypropylene glycol with a number average molecular weight of 1000 to 6000 in quantities of more than 70% by weight and aromatic, aliphatic, or both aromatic and aliphatic monoisocyanates, or by reacting
   b) linear monoalcohol mixtures containing polypropylene glycol monoalkyl ethers with a number average molecular weight of 500 to 2000 in quantities of more than 70% by weight and aromatic, aliphatic, or both aromatic and aliphatic diisocyanates.

4. Sealing and adhesive compositions as claimed in claim 3, wherein the alkoxysilane-terminated polyurethanes have been produced by reaction of alkoxysilanes with NCO-terminated polyurethane prepolymers having an average NCO functionality of at least 2 obtained OH-terminated polyol mixtures and diisocyanates.

5. Sealing and adhesive compositions as claimed in claim 3, wherein the alkoxysilane-terminated polyurethanes have been produced by reaction or alkoxysilanes and NCO-terminated polyurethane prepolymers having an average NCO functionality of at least 1 and less than 2 obtained by
   a) reaction of OH-terminated polyol mixtures with diisocyanates to NCO-terminated polyurethane prepolymers having an average NCO functionality of at least 2 and partial reaction of the NCO groups with linear or branched aliphatic monofunctional alcohols containing 1 to 18 carbon atoms, monoalkyl polyether alcohols, or both to form a polyurethane prepolymer having an average NCO functionality of at least 1 and less than 2, or
   a') reaction of OH-terminated polyol mixtures with a mixture of mono- and diisocyanates to form NCO-terminated polyurethane prepolymers having an average NCO functionality of at least 1 and less than 2.

6. Sealing and adhesive compositions as claimed in claim 5, wherein the NCO-terminated polyurethane prepolymers have been produced from linear OH-terminated polyol mixtures which contain polypropylene glycol having a number average molecular weight of 1000 to 6000.

7. Sealing and adhesive compositions as claimed in claim 6, comprising alkoxysilane-terminated polyurethanes prepared by reaction of substantially all the free NCO groups of the NCO-terminated polyurethane prepolymers with alkoxysilanes selected from the group consisting of alkoxysilanes corresponding to the following general formula:

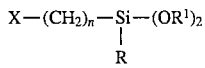

in which
X=SH, NHR$^2$,

or (NH—CH$_2$—CH$_2$)$_m$—NHR$^2$;
R=CH$_3$, —CH$_2$H$_5$ or OR$^1$;
R$^1$=an optionally substituted aliphatic, cycloaliphatic or aromatic hydrocarbon radical containing 1 to 10 carbon atoms;
R$^2$=H or an optionally substituted aliphatic, cycloaliphatic or aromatic hydrocarbon radical containing 1 to 10 carbon atoms;
n=2 to 6;
m=1 or 2.

8. A process for the production of moisture-curing sealing and adhesive compositions according to claim 1, wherein alkoxysilane-terminated polyurethanes which have been prepared by reaction of substantially all the free NCO groups of NCO-terminated polyurethane prepolymers and alkoxysilanes are added with stirring, at temperatures of 15° to 80° C., to diurethanes which have been prepared from diol mixtures and monofunctional isocyanates with substantially all the free OH groups reacting off or from diisocyanates and monofunctional alcohols with substantially all the free NCO groups reacting off, followed by using said compositions in a process of joining or sealing surfaces.

9. A process for joining or sealing, surfaces wherein the improvement comprises using mixtures according to claim 1 containing alkoxysilane-terminated polyurethanes and diurethanes as moisture-curing sealing compositions or adhesive compositions.

10. Sealing and adhesive compositions as claimed in claim 1, comprising alkoxysilane-terminated polyurethanes in quantities of 25 to 45% by weight, diurethanes in quantities of 10 to 40% by weight, and other additives in quantities of 10 to 80% by weight, based on the particular composition.

11. Sealing and adhesive compositions as claimed in claim 1, comprising as plasticizers diurethanes which have been produced by reacting a) linear diol mixtures containing polypropylene glycol with a number average molecular weight of 1000 to 6000 in quantities of more than 50% by weight and aromatic, aliphatic, or both aromatic and aliphatic monoisocyanates, or by reacting b) linear monoalcohol mixtures containing polypropylene glycol monoalkyl ethers with a number average molecular weight of 500 to 2000 in quantities of more than 50% by weight and aromatic, aliphatic, or both aromatic and aliphatic diisocyanates.

12. Sealing and adhesive compositions as claimed in claim 1, wherein the alkoxysilane-terminated polyurethanes have been produced by reaction of alkoxysilanes with NCO-terminated polyurethane prepolymers having an average NCO functionality of at least 2 obtained from OH-terminated polyol mixtures and diisocyanates.

13. Sealing and adhesive compositions as claimed in claim 1, wherein the alkoxysilane-terminated polyurethanes have been produced by reaction of alkoxysilanes and NCO-terminated polyurethane prepolymers having an average NCO functionality of at least 1 and less than 2 obtained by
a) reaction of OH-terminated polyol mixtures with diisocyanates to NCO-terminated polyurethane prepolymers having an average NCO functionality of at least 2 and partial reaction of the NCO groups with linear or branched aliphatic monofunctional alcohols containing 1 to 18 carbon atoms, monoalkyl polyether alcohols, or both to form a polyurethane prepolymer having an average NCO functionality of at least 1 and less than 2, or
a') reaction of OH-terminated polyol mixtures with a mixture of mono- and diisocyanates to form NCO-terminated polyurethane prepolymers having an average NCO functionality of at least 1 and less than 2.

14. Sealing and adhesive compositions as claimed in claim 4, wherein the NCO-terminated polyurethane prepolymers have been produced from linear OH-terminated polyol mixtures which contain polypropylene glycol having a number average molecular weight of 1000 to 6000.

15. Sealing and adhesive compositions as claimed in claim 1, wherein the NCO-terminated polyurethane prepolymers have been produced from linear OH-terminated polyol mixtures which contain polypropylene glycol having a number average molecular weight of 1000 to 6000.

16. Sealing and adhesive compositions as claimed in claim 14, comprising alkoxysilane-terminated polyurethanes prepared by reaction of substantially all the free NCO groups of the NCO-terminated polyurethane prepolymers with alkoxysilanes selected from the group consisting of alkoxysilanes corresponding to the following general formula:

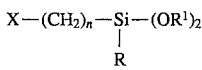

in which
X=SH, NHR$^2$,

or (NH—CH$_2$—CH$_2$)$_m$—NHR$^2$;
R=—CH$_3$, —CH$_2$H$_5$ or OR$^1$;
R$^1$=an optionally substituted aliphatic, cycloaliphatic or aromatic hydrocarbon radical containing 1 to 10 carbon atoms;
R$^2$=H or an optionally substituted aliphatic, cycloaliphatic or aromatic hydrocarbon radical containing 1 to 10 carbon atoms;
n=2 to 6;
m=1 or 2.

17. Sealing and adhesive compositions as claimed in claim 5, comprising alkoxysilane-terminated polyurethanes prepared by reaction of substantially all the free NCO groups of the NCO-terminated polyurethane prepolymers with alkoxysilanes selected from the group consisting of alkoxysilanes corresponding to the following general formula:

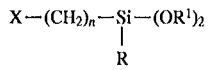

in which
X=SH, NHR²,

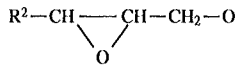

or (NH—CH₂—CH₂)$_m$—NHR²;
R=—CH₃, —CH₂H₅ or OR¹;
R¹=an optionally substituted aliphatic, cycloaliphatic or aromatic hydrocarbon radical containing 1 to 10 carbon atoms;
R²=H or an optionally substituted aliphatic, cycloaliphatic or aromatic hydrocarbon radical containing 1 to 10 carbon atoms;
n=2 to 6;
m=1 or 2.

18. Sealing and adhesive compositions as claimed in claim 4, comprising alkoxysilane-terminated polyurethanes prepared by reaction of substantially all the free NCO groups of the NCO-terminated polyurethane prepolymers with alkoxysilanes selected from the group consisting of alkoxysilanes corresponding to the following general formula:

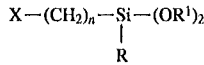

in which
X=SH, NHR²,

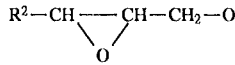

or (NH—CH₂—CH₂)$_m$—NHR²;
R=—CH₃, —CH₂H₅ or OR¹;
R¹=an optionally substituted aliphatic, cycloaliphatic or aromatic hydrocarbon radical containing 1 to 10 carbon atoms;
R²=H or an optionally substituted aliphatic, cycloaliphatic or aromatic hydrocarbon radical containing 1 to 10 carbon atoms;
n=2 to 6;
m=1 to 2.

19. Sealing and adhesive compositions as claimed in claim 3, comprising alkoxysilane-terminated polyurethanes prepared by reaction of substantially all the free NCO groups of the NCO-terminated polyurethane prepolymers with alkoxysilanes selected from the group consisting of alkoxysilanes corresponding to the following general formula:

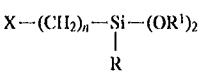

in which
X=SH, NHR²,

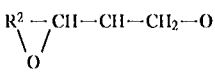

or (NH—CH₂—CH₂)$_m$—NHR²;
R=—CH₃, —CH₂H₅ or OR¹;
R¹=an optionally substituted aliphatic, cycloaliphatic or aromatic hydrocarbon radical containing 1 to 10 carbon atoms;
R²=H or an optionally substituted aliphatic, cycloaliphatic or aromatic hydrocarbon radical containing 1 to 10 carbon atoms;
n=2 to 6;
m=1 or 2.

20. Sealing and adhesive compositions as claimed in claim 2, comprising alkoxysilane-terminated polyurethanes prepared by reaction of substantially all the free NCO groups of the NCO-terminated polyurethane prepolymers with alkoxysilanes selected from the group consisting of alkoxysilanes corresponding to the following general formula:

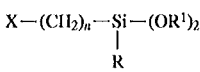

in which
X=SH, NHR²,

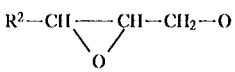

or (NH—CH₂—CH₂)$_m$—NHR²;
R=—CH₃, —CH₂H₅ or OR¹;
R¹=an optionally substituted aliphatic, cycloaliphatic or aromatic hydrocarbon radical containing 1 to 10 carbon atoms;
R²=H or an optionally substituted aliphatic, cycloaliphatic or aromatic hydrocarbon radical containing 1 to 10 carbon atoms;
n=2 to 6;
m=1 or 2.

* * * * *